United States Patent
Williams

(10) Patent No.: US 9,399,423 B2
(45) Date of Patent: Jul. 26, 2016

(54) ANCHOR FOR DETACHABLY CONNECTING A WHEELCHAIR SECUREMENT APPARATUS TO A SUPPORT SURFACE WITHIN A MOTOR VEHICLE

(71) Applicant: Indiana Mills & Manufacturing, Inc., Westfield, IN (US)

(72) Inventor: Keith James Williams, Indianapolis, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 0 days.

(21) Appl. No.: 14/495,173

(22) Filed: Sep. 24, 2014

(65) Prior Publication Data

US 2015/0086288 A1    Mar. 26, 2015

Related U.S. Application Data

(60) Provisional application No. 61/882,373, filed on Sep. 25, 2013.

(51) Int. Cl.
*B60P 7/08* (2006.01)
*B60P 3/073* (2006.01)
*A61G 3/08* (2006.01)

(52) U.S. Cl.
CPC ............... *B60P 7/0807* (2013.01); *B60P 3/073* (2013.01); *A61G 3/0808* (2013.01); *Y10T 29/49826* (2015.01)

(58) Field of Classification Search
CPC ................................ B60P 3/073; B60P 7/0807
USPC ............... 410/7, 10–12, 21–23, 97, 100, 106, 410/107, 111; 280/304.1; 297/DIG. 4
See application file for complete search history.

(56) References Cited

U.S. PATENT DOCUMENTS

| | | | | |
|---|---|---|---|---|
| 3,102,708 | A * | 9/1963 | Crain | B60P 7/0807 410/107 |
| 4,497,152 | A * | 2/1985 | Weissner | |
| 6,287,060 | B1 * | 9/2001 | Girardin | 410/11 |
| 6,641,342 | B1 | 11/2003 | Girardin | |
| 6,869,260 | B1 | 3/2005 | Mason | |

* cited by examiner

*Primary Examiner* — Stephen Gordon
(74) *Attorney, Agent, or Firm* — Barnes & Thornburg LLP

(57) ABSTRACT

An anchor detachably connects a wheelchair securement apparatus to a support surface within a motor vehicle and includes a plate having a top surface defining an opening therein, a receiving member secured to the plate and defining an elongated bore to receive and engage a pin coupled to the wheelchair securement apparatus, a plunger within and axially movable along the bore, and a first biasing member between a bottom surface of the plunger and a wall of the bore. The plate and the receiving member are together mountable to the support surface. The first biasing member acts against the bottom surface of the plunger to bias the plunger away from the wall of the bore toward the opening defined through the plate, and the plunger movable toward the wall of the bore against a biasing force of the first biasing member.

18 Claims, 6 Drawing Sheets

ANCHOR FOR DETACHABLY CONNECTING A WHEELCHAIR SECUREMENT APPARATUS TO A SUPPORT SURFACE WITHIN A MOTOR VEHICLE

CROSS-REFERENCE TO RELATED APPLICATION

This patent application claims the benefit of, and priority to, U.S. Patent Application Ser. No. 61/882,373, filed Sep. 25, 2013, the disclosure of which is incorporated herein by reference in its entirety.

FIELD OF THE INVENTION

The present invention relates generally to devices for securing wheelchairs to motor vehicles, and more specifically to vehicle mountable anchor devices that are detachably connectable to wheelchair securement apparatuses.

BACKGROUND

Wheelchairs are typically secured within motor vehicles by attaching one or more webs between the wheelchair and the floor of the motor vehicle. Various structures and mechanisms are known for securing such one or more webs to the floor of the motor vehicle.

SUMMARY

The present invention may comprise one or more of the features recited in the attached claims, and/or one or more of the following features and combinations thereof. In one aspect, an anchor for detachably connecting a wheelchair securement apparatus to a support surface within a motor vehicle may comprise a plate having a top surface defining an opening therein, a receiving member secured to the plate and defining an elongated bore therein, a plunger within and axially movable along the elongated bore and a biasing member. The elongated bore may have an open end defined by the opening in the top surface of the plate and a wall at an opposite end thereof. The elongated bore may be configured to receive therein and engage a pin coupled to the wheelchair securement apparatus, and the plate and the receiving member may be together mountable to the support surface within the motor vehicle. The first biasing member may be positioned between a bottom surface of the plunger and the wall of the bore defined in the receiving member. The first biasing member may act against the bottom surface of the plunger to bias the plunger away from the wall of the bore toward the opening defined through the top surface of the plate. The plunger may be movable toward the wall of the bore against a biasing force of the first biasing member.

The top surface of the plate may be planar at least about the opening defined therein and the plunger may have a planar top surface opposite the bottom surface of the plunger. With the pin outside of the bore, the first biasing member may bias the plunger away from the wall of the bore with the planar top surface of the plunger positioned substantially coplanar with the planar top surface of the plate.

In the anchor described in the first paragraph of this SUMMARY section, the plate may comprise a bottom surface opposite the top surface thereof, the receiving member extending away from the bottom surface of the plate, and the receiving member may be configured to extend into an opening through the support surface with the bottom surface of the plate abutting the support surface about the opening through the support surface. In such embodiments, the anchor may further comprise a mounting plate defining an opening therethrough, with the mounting plate received on the receiving member with the receiving member extending through the opening in the mounting plate, and a fixation member to engage a portion of the receiving member extending through the opening in the mounting plate with the mounting plate positioned between the plate and the fixation member. The fixation member may be movable along the receiving member and against the mounting plate to advance the mounting plate toward the bottom surface of the plate to clamp the support surface between the bottom surface of the plate and a top surface of the mounting plate. The receiving member may comprise a first elongated shaft defining the bore therein, at least the portion of the first shaft may be threaded, the fixation member may comprise a threaded nut, and the fixation member may be movable along the receiving member by advancing the threaded nut onto the threaded portion of the first shaft. Alternatively or additionally, the bottom surface of the plate may be planar, and the top surface of the mounting plate may be planar.

In the anchor described in the first paragraph of this SUMMARY section, the top surface of the plate may be planar at least about the opening defined therein and the bottom surface of the plate may be planar. The plate may define a thickness between the planar top surface and the planar bottom surface thereof of less than about 0.15 inches. Alternatively or additionally, the thickness may be about 0.13 inches.

In the anchor described in the first paragraph of this SUMMARY section, the receiving member and the plate may be separate parts and the receiving member may be attached to the plate. Alternatively, the receiving member may be integral with the plate such that the receiving member and the plate together define a unitary member.

In the anchor described in the first paragraph of this SUMMARY section, the anchor may further comprise the pin, and the pin may comprise a first shaft defining a detent area on an outer surface thereof, and at least one detent normally extending radially outwardly from the outer surface of the first shaft at the detent area. The at least one detent may be retractable within the first shaft at the detent area. The elongated bore may define a first bore portion extending from the opening in the top surface of the plate toward the wall of the elongated bore. The opening in the top surface of the plate and the first bore portion may both define a first cross-sectional area sized to prevent at least the detent area of the first shaft from axially entering the first bore portion via the opening in the top surface of the plate with the at least one detent extending radially outwardly from the outer surface of the first shaft and to allow the first shaft, including the detent area, to axially enter and move along the first bore portion with the at least one detent retracted within the first shaft.

The elongated bore may define a second bore portion extending from the wall of the bore toward the first bore portion. The second bore portion may define a second cross-sectional area that is greater than the first cross-sectional area defined by the first bore portion and that is sized to allow the first shaft, including the detent area, to axially enter and move along the second bore portion with the at least one detent extending radially outwardly from the outer surface of the first shaft or retracted within the first shaft. The pin may be secured to the receiving member by axially passing the detent area of the first shaft into and through the first bore portion and into the second bore portion with the at least one detent retracted within the first shaft, and extending the at least one detent radially outwardly from the outer surface of the first shaft with at least the detent area of the pin disposed within the second bore portion. The elongated bore may define a transition portion between the first bore portion and the second bore portion. The transition portion may extending between the first cross-sectional area of the first bore portion and the second cross-sectional area of the second bore portion. The biasing force of the first biasing member may act against the bottom surface of the plunger with the at least one detent extending radially outwardly from the outer surface of the first shaft pin into the second bore portion to cause the plunger to force the at least one detent into engagement with the transition portion of the bore to secure the pin to the receiving member.

In the anchor described in either or both of the two preceding paragraphs of this SUMMARY section, the pin may further comprise a second shaft axially received within and axially movable relative to the first shaft. The second shaft may define a recess portion on an outer surface thereof, and the recess portion may define at least one recess radially extending into the outer surface of the second shaft. The at least one recess may be sized to receive therein the at least one detent with the detent portion of the first shaft aligned with the recess portion of the second shaft to thereby retract the at least one detent within the first shaft, the outer surface of the second shaft otherwise forcing the at least one detent to extend radially outwardly from the outer surface of the first shaft. The first shaft may define a first end and a second end opposite the first end thereof. The second shaft may define a first end that extends toward the first end of the first shaft with the second shaft axially received within the first shaft, and a second end opposite the first end of the second shaft. The pin may further comprise a second biasing member between the first end of the first shaft and the first end of the second shaft. The second biasing member may normally bias the first end of the second shaft away from the first end of the first shaft so that the at least one recess of the recess portion of the second shaft is not aligned with the at least one detent normally extending radially outwardly from the detent portion of the first shaft. The second shaft may be axially movable relative to the first shaft against a biasing force of the second biasing member to align the at least one recess defined in the recess portion of the second shaft with the at least one detent normally extending radially outwardly from the portion of the first shaft.

In the anchor described in any one or combination of the preceding three paragraphs of this SUMMARY section, a securing member may be affixed to the first shaft. The securing member may be configured to trap the wheelchair securement apparatus between the securing member and the receiving member with the elongated bore engaging the pin.

In the anchor described in any one or combination of the preceding paragraphs of this SUMMARY section, the anchor may comprise the pin and the pin may comprise at least one shaft. The at least one shaft may be rotatable 360 degrees within the elongated bore with the elongated bore engaging the pin.

In another aspect, an anchor for detachably connecting a wheelchair securement apparatus to a support surface within a motor vehicle may comprise a pin configured to be coupled to the wheelchair securement apparatus and a receiving member configured to be mounted to the support surface within the motor vehicle. The pin may have a shaft including a detent area with at least one detent normally extending radially outwardly from an outer surface of the shaft, and with the at least one detent retractable within the shaft. The receiving member may define an elongated bore therein having an open end and defining a first bore portion having a first cross-sectional area extending from the open end toward an opposite end of the elongated bore. The elongated bore may define a second bore portion having a second cross-sectional area that is greater than the first cross-sectional area and extending from the opposite end of the elongated bore toward the first bore portion. The first cross-sectional area may be sized to prevent at least the detent area of the shaft from axially entering the first bore portion via the open end of the elongated bore with the at least one detent extending radially outwardly from the outer surface of the shaft and to allow the shaft, including the detent area, to axially enter and move along the first bore portion with the at least one detent retracted within the shaft. The second cross-sectional area may be sized to allow the shaft, including the detent area, to axially enter and move along the second bore portion with the at least one detent extending radially outwardly from the outer surface of the shaft or retracted within the first shaft. The pin may be secured to the receiving member by axially passing the detent area of the shaft into and through the first bore portion and into the second bore portion with the at least one detent retracted within the shaft, and then extending the at least one detent radially outwardly from the outer surface of the shaft with at least the detent area of the pin disposed within the second bore portion.

In another aspect, a method of detachably connecting a wheelchair securement apparatus to a support surface within a motor vehicle may comprise passing one end of a shaft, having a securing member attached to an opposite end thereof, through an opening in the wheelchair securement apparatus, retracting within the shaft at least one detent that normally extends radially outwardly from an outer surface of the shaft at a detent area of the shaft, with the at least one detent retracted within the shaft and the one end of the shaft extending through the opening in the wheelchair securement apparatus, passing the one end of the shaft including the detent area of the shaft axially into and through a first bore portion and into a second bore portion of an elongated bore of a receiving member mounted to the support surface within the motor vehicle, the first bore portion sized to prevent at least the detent area of the shaft from axially entering the first bore portion with the at least one detent extending radially outwardly from the outer surface of the shaft the second bore portion sized to allow the detent area of the shaft to axially enter and move along the second bore portion with the at least one detent extending radially outwardly from the outer surface of the shaft, and with at least the detent area of the shaft disposed within the second bore portion, securing the wheelchair securement apparatus to the support surface of the motor vehicle by extending the at least one detent radially outwardly from the outer surface of the shaft to trap the wheelchair securement apparatus on the shaft between the securing member and the elongated bore of the receiving member.

DESCRIPTION OF THE ILLUSTRATIVE EMBODIMENTS

Figure 1:
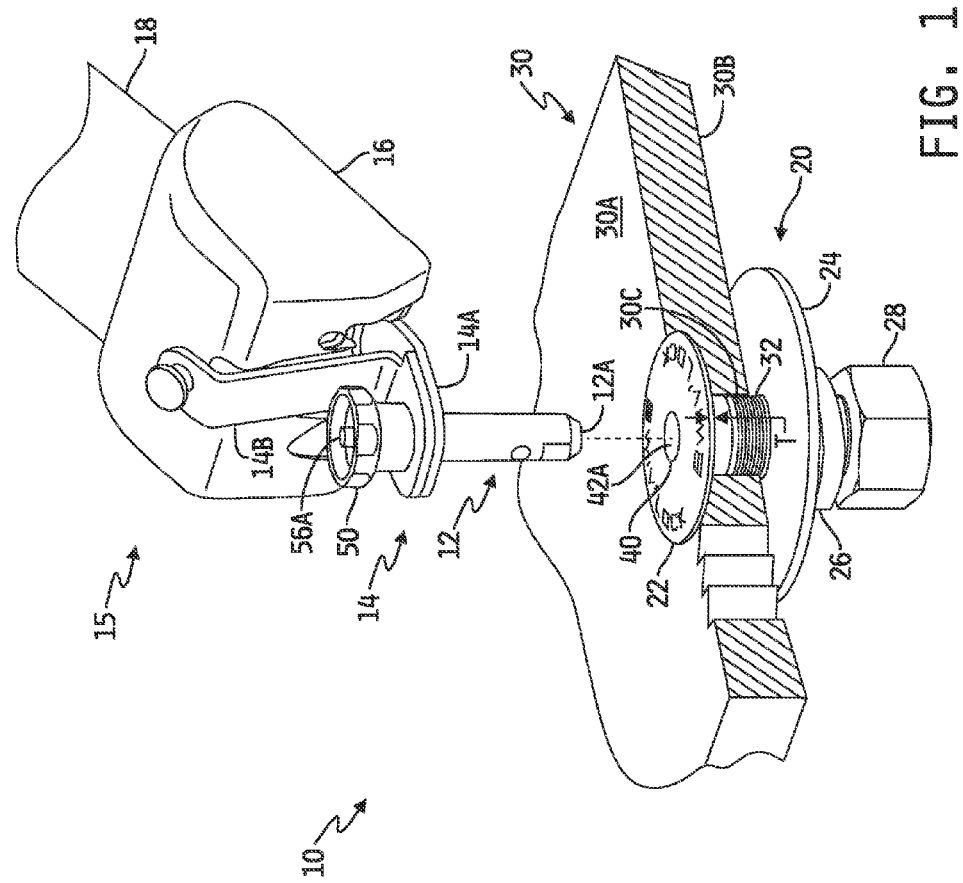
FIG. 1 is a front perspective view of an embodiment of a securement system, including an anchor device and a securement apparatus, for detachably securing at least one object to a support structure.

For the purposes of promoting an understanding of the principles of the invention, reference will now be made to a number of illustrative embodiments shown in the attached drawings and specific language will be used to describe the same.

Referring now to the attached FIGS. 1-6, an embodiment is shown of a securement system 10, including an embodiment of an anchor device 12, 20 and a securement apparatus 15, for detachably securing at least one object to a support structure 30. In the illustrated embodiment, the securement apparatus 15 includes a retractor 16 with one end of a web 18 attached thereto, and the retractor 16 in such embodiments may be a manually actuated retractor, i.e., one in which the web 18 is manually drawn into and paid out of the retractor 16, or an automatically actuated retractor, i.e., one which includes a spool or other structure onto or about which the web 18 is automatically wound, e.g., under the bias of one or more biasing springs, and from which the web 18 may be manually paid out, e.g., by applying a force to the web 18 opposite to that applied by the biasing force of the one or more biasing springs and that is greater than the biasing force of the one or more biasing springs. In the former case, a manually activated retractor may be step-wise locking, i.e., the retractor may include a ratcheting mechanism which step-wise locks the web 18 from being withdrawn from the retractor as the web 18 is drawn into the retractor, or may additionally or alternatively include a separate, manually activated locking mechanism which locks the web 18 from being withdrawn from the retractor. In the latter case, an automatically actuated retractor may include a manually activated locking mechanism which locks the web 18 from being withdrawn from the retractor, or may include an automatic locking mechanism such that the retractor 16 may be a conventional automatic locking retractor (ALR), emergency locking retractor (ELR) or the like. In alternate embodiments of the system 10, the securement apparatus 15 may be or include one or more other conventional securement apparatus examples of which include, but are not limited to, a clip, clamp, hook, carabiner, eyelet, winch, ratcheting device or other mechanism that can be selectively attached to the anchor device 12, 20 and coupled directly or indirectly, e.g., via a strap, belt, cord or web, which may be of fixed or adjustable length, to the object to be secured to the support structure 30.

In the illustrated embodiment, the support structure 30 is a floor, or portion thereof, of a motor vehicle, although in other embodiments the support structure 30 may be or include one or more other portions of a motor vehicle, one or more portions of a wheeled vehicle towed by a motor vehicle, e.g., a trailer, one or more portions of a wheeled vehicle pushed by a motor vehicle, or the like. In alternate embodiments, the support structure 30 may be a floor or other portion of other movable vessels, examples of which include, but should not be limited to, a marine vessel, an aircraft, a rail car or the like, or may alternatively be a floor or other portion of a non-movable structure such as a residential or commercial building.

In any case, the anchor device 12, 20 includes a pin 12 and a base 20. The base 20 is mountable to the support structure 30, and the pin 12 is detachably securable to the base 20. In the embodiment illustrated in FIGS. 1-6, the securement apparatus 15 includes a retractor 16 and a web 18, and the support structure 30 is a floor of a motor vehicle. In this embodiment, the base 20 of the anchor device 12, 20 is mounted to the floor 30 of the motor vehicle, and the retractor 16 is configured to be coupled to the pin 12. At least one bracket 14 extends from the retractor 16, and the bracket 14 defines a bore therethrough that is sized to receive the pin 12 therein and therethrough. As shown in the FIGS., the at least one bracket 14 illustratively includes a pair of brackets 14A, 14B attached to the retractor 16, e.g., the bracket 14A attached to the bottom of the retractor 16 and the bracket 14B attached to the top of the retractor 16, and the brackets 14A, 14B each define a bore 14C therethrough, and the bores 14C are aligned with each other such that the pin 12 extends therethrough to detachably couple the pin 12 to the retractor 16. In such embodiments, the pin 12 and retractor 16 thus define separate and unconnected elements that may be coupled together as just described to detachably secure the retractor 16 to the pin 12. In alternate embodiments, the pin 12 may be secured to or integral with the retractor 16 such that the combination of the pin 12 and retractor 16 form a single structure. In any case, the pin 12 and retractor 16 are illustratively stored separately from the base 20 when not in use, and in use the pin 12 and retractor 16 are detachably coupled and secured to the base 20 via engagement of the pin 12 with the base 20 as will be described in greater detail hereinafter.

In embodiments in which the support structure 30 is a floor of a motor vehicle, the anchor device 12, 20 may illustratively be provided to detachably connect a wheelchair securement apparatus to the motor vehicle floor 30. In such embodiments, the combination of the retractor 16 and the web 18 may comprise the wheelchair securement apparatus, and an end of the web 18 opposite to that which is attached to the retractor 16 is configured to be selectively attached, e.g., via a hook, clip, clamp, tongue/buckle arrangement or other conventional detachable attachment mechanism, to the frame, wheel or other component of a conventional wheelchair. In any case, the wheelchair securement apparatus is secured to the floor 30 of the motor vehicle when the pin 12 securely engages the base 20 of the anchor device 12, 20, as will be described in detail below.

Figure 3:
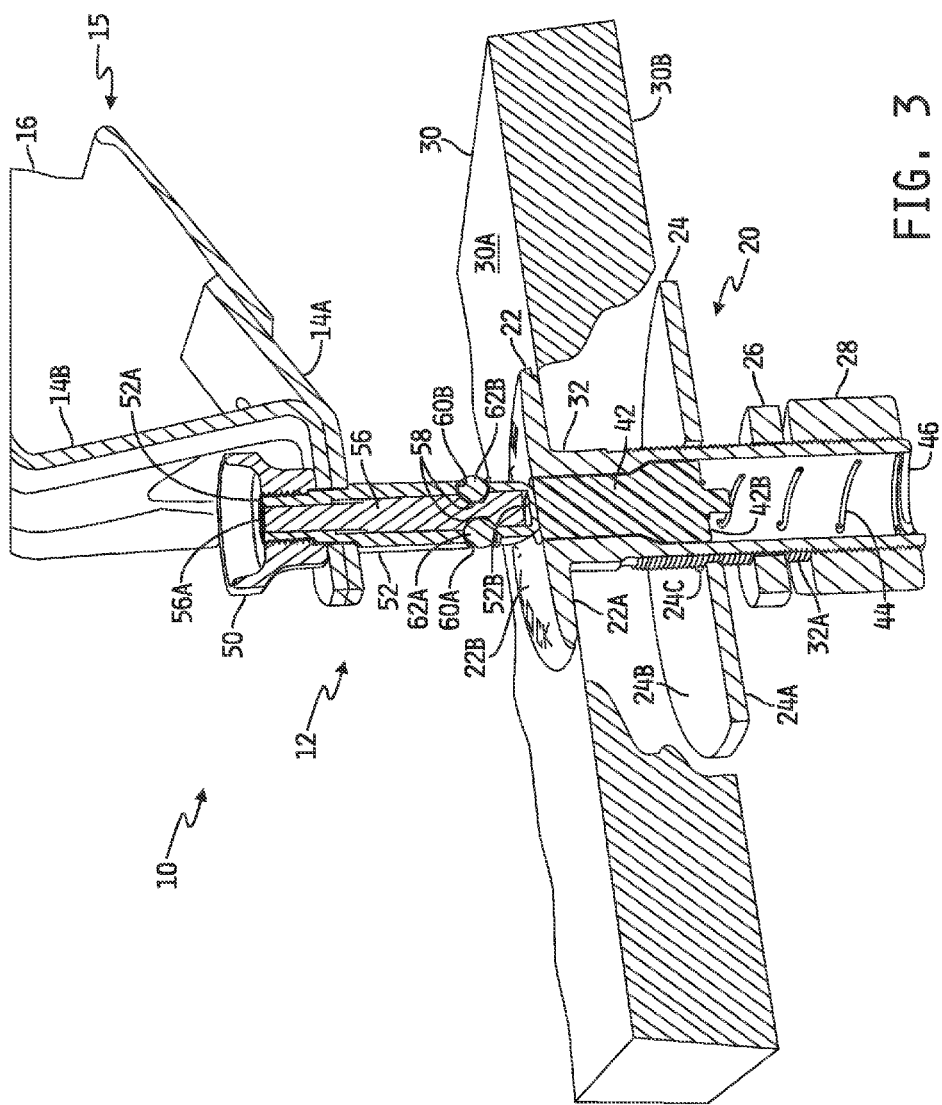
FIG. 3 is a cross-sectional view similar to FIG. 2 showing the pin of the anchor device in it actuated state and outside of the base of the anchor device.

The base 20 illustratively includes a plate 22 coupled to an elongated receiving member 32 which extends away from the plate 22, e.g., perpendicularly away from the bottom surface 22A plate 22 (see, e.g., FIG. 3). In one embodiment, the receiving member 32 is integral with the plate 22 such that the plate 22 and the receiving member 32 form a unitary member, although in other embodiments the plate 22 and the receiving member 32 may be separate components configured to be attachable and securable to each other. In any case, the base 20 further includes a mounting plate 24 and a fixation member 28 securable to the receiving member 32.

The base 20 is mounted to the floor 30 of the motor vehicle by first forming an opening 30C through the floor 30 that is sized to receive the receiving member 32 therein and therethrough. The receiving member 32 is illustratively sized to extend completely through the opening 30C formed through the floor 30 such that a portion of the receiving member 32 extends from a bottom surface 30B of the floor 30 when the bottom surface 22A of the plate 20 (see, e.g., FIG. 3) abuts the top surface 30A of the floor 30 about the opening 30C. In one embodiment, the outer periphery of the receiving member 30 has a circular cross section such that the outer surface of the receiving member 32 forms a cylinder, and in this embodiment the opening 30C may be illustratively formed as a bore through the floor 30, although it will be understood that the outer periphery of the receiving member 32 may alternatively have a non-circular cross section. In any case, the combination of the plate 22 and receiving member 32 is mounted to the floor 30 of the motor vehicle such that the receiving member 32 extends into and through the opening 30C formed in and through the floor 30 until the bottom surface 22A of the plate 22 abuts the top surface 30A of the floor 30 about the opening 30C.

The mounting plate 24 illustratively has a bottom surface 24A and a top surface 24B opposite the bottom surface, and the mounting plate 24 defines an opening 24C therethrough (see, e.g. FIG. 3) that is sized to receive the receiving member 32 therein and therethrough. The receiving member 32, extending downwardly through the opening 30C and through the bottom surface 30B of the floor 30, is passed through the opening 24C defined through the mounting plate 24, and the fixation member 28 then engages the receiving member 32 with the mounting plate 24 between the bottom surface 30B of the floor 30 and the fixation member 28. The fixation member 28 secures the mounting plate 24 against the bottom surface 30B of the floor 30. In the illustrated embodiment, for example, the elongated receiving member 32 is an elongated shaft defining a threaded portion 32A adjacent to its lower terminal end, and the fixation member 28 is a threaded nut. A washer 26, e.g., a lock washer or other conventional washer, is, in this embodiment, illustratively positioned between the bottom surface 24A of the mounting plate 24 (see, e.g., FIG. 3) and the threaded nut 28. In any case, the combination of the plate 22 and the receiving member 32 is mounted and secured to the floor 30 of the motor vehicle by advancing the threaded nut 28 onto the threaded portion 32A of the shaft 32. The combination of the threaded nut and the lock washer 26 acting against the bottom surface 24A of the mounting plate 24 advances the mounting plate 24 toward the bottom surface 30B of the floor 30 sufficiently to trap, i.e., clamp, the floor 30 between bottom surface 22A of the plate 22 and the top surface 24B of the mounting plate 24 (see, e.g., FIG. 3) to thereby secure the base 20 of the anchor device to the floor 30. In embodiments in which the opposing surfaces 30A, 30B of the floor 30 are planar, at least the bottom 22A surface of the plate 22 and the top 24B surface of the mounting plate 24 are each likewise planar, although it will be understood that in embodiments in which the top surface 30A and/or the bottom surface 30B of the floor 30 are non-planar, the bottom surface 22A of the plate 22 and/or the top surface 24B of the mounting plate 24 may likewise be non-planar and formed to fit securely against the opposing surfaces 30A, 30B of the floor 30.

In some embodiments, the top surface 22B of the plate 22 is planar as illustrated in FIG. 1, and on other embodiments the top surface 22B of the plate may be arcuate-shaped as illustrated in FIGS. 2-6, although it will be understood that the top surface 22B of the plate 22 may take on any shape which may illustratively be selected to conform to the shape of the top surface 30A of the floor 30. In any case, as illustrated in FIG. 1, the plate 22 defines a thickness, T, between the top and bottom surfaces 30A, 30B. Illustratively, the thickness, T, of the plate 22 is selected to provide for a low-profile anchor base 20 having a correspondingly low trip hazard. It is desirable, for example, to select the thickness, T, to be less than about 0.20 inches, with a thickness, T, of less than about 0.15 inches being more desirable, and in one embodiment the thickness, T, is selected to be about 0.13 inches.

The top surface 22B of the plate 22 defines an opening 40 therein, and the receiving member 32 defines an opening, e.g., an elongated bore, 40A-C therein and therethrough. The bore 40A-40C is open at one end to the opening 40 in the top surface of the plate 22; that is, the open end of the bore 40A-40C is defined by the opening 40 in the top surface 22B of the plate 22, and the bore 40A-40C defines a wall 46 at its opposite end. The bore 40A-40C illustratively includes three portions (or regions or segments) 40A, 40B, 40C each defining a different bore cross-sectional area. For example, a bore portion, region or segment 40A defining a first bore cross-sectional area, e.g., first bore diameter, extends from the opening 40 downwardly toward the wall 46 such that the opening 40 and the bore portion 40A share a common cross-sectional area, a bore portion, region or segment 40B defining a second bore cross-sectional area, e.g., second bore diameter, extends upwardly from the wall 46 toward the bore portion 40A, and a bore portion, region or segment 40C extending between and joining the bore portions, regions or segments 40A and 40B. In the illustrated embodiment, the second bore cross-sectional area is greater than the first bore cross-sectional area, and the bore portion, region or segment 40C tapers or slopes, e.g. linearly (or, alternatively, non-linearly), between the cross-sectional areas of the bore portions, regions or segments 40A and 40B. The bore portion, region or segment 40C thus forms a transition portion, region or segment between the bore portions, regions or segments 40A and 40B that extends between the first cross-sectional area of the bore portion 40A and the second cross-sectional area of the bore portion 40B.

An elongated, movable plunger 42 defines a top surface 42A at one end and a bottom surface 42B at an opposite end, and the plunger 42 is slidably received within and axially movable along the bore 40A-40C. A biasing member 44, e.g., a spring or other conventional biasing member, is positioned between the bottom surface 42B of the plunger 42 and the wall 46 defined at the terminal end of the bore segment 40C, and the biasing member 44 exerts a biasing force against the plunger 42 that biases the plunger 42 toward the opening 40 in the top surface 22B of the plate 22. Illustratively, the outer surface of the plunger 42 is shaped complementarily to the three regions 40A, 40B and 40C of the bore 40A-40C, and the transition section 40C of the bore 40A-40C thus provides for a positive stop to the upward travel of the plunger 42 within the bore 40A-40C. The plunger 42 is illustratively sized such that the top surface 42A of the plunger 42 extends to and terminates with the top surface 22B of the plate 22 at least bout the opening 40 when the biasing member 44 biases the plunger 42 to its topmost position illustrated in FIGS. 1 and 2. In embodiments in which the top surface 22B of the plate 22 is planar, e.g., as illustrated in FIG. 1, the top surface 42A of the plunger 42 is likewise planar so that when the biasing member 44 biases the plunger 42 to its topmost position, the planar top surface 42A of the plunger 42 is co-planar with the planar top surface 22B of the plate 22. In embodiments in which the top surface 22B of the plate 22 is not entirely planar, but is planar at least in an area of the top surface 22B that surrounds the opening 40, the top surface 42A of the plunger 42 is illustratively also planar so that when the biasing member 44 biases the plunger 42 to its topmost position, the planar top surface 42A of the plunger 42 is co-planar with the planar top surface 22B of the plate 22 surrounding the opening. In embodiments in which the top surface 22B of the plate 22 is not planar, the top surface 42A of the plunger 42 is illustratively shaped to match that of the shape of the top surface 22B of the plate 22 at least about the opening 40. Illustratively, this feature inhibits entry of dust, dirt and other particles into the bore 40A-40C.

The biasing member 44 biases the plunger 42 to its topmost position as just described as long as no counterforce greater than the biasing force of the biasing member 44 is applied to the top surface 42A of the plunger 42. When a counterforce greater than the biasing force of the biasing member 44 is applied to the top surface 42A of the plunger 42, e.g., by forcing the terminal end 12A of the pin 12 against the top surface 42A of the plunger 42, the plunger 42 moves downwardly toward the wall 46 of the bore 40A-40C against the biasing force of the biasing member 44. This allows entry of the pin 12 into the bore 40A-40C so that the pin 12 may engage the bore 40A-40C as will be described in detail below.

The pin 12 illustratively includes a securing member 50, e.g., in the form of a cup having an open top end and at least one sidewall terminating at a bottom end, defining a bore 50A therethrough that is sized to receive a top portion 52A of an outer shaft 52 therein and therethrough. The outer shaft 52 has a terminal end opposite to the top portion 52A that is defined by the terminal end 12A of the pin 12. The external surface of the outer shaft 52 illustratively defines an outer shoulder 52C between the top portion 52A and the terminal end 12A of the outer shaft 52, and the outer shoulder 52C illustratively provides a positive stop to the upward travel of the outer shaft 52 through the opening 14C of the brackets 14A, 14B. The external surface of the outer shaft 52 further illustratively defines another outer shoulder 52D between the outer shoulder 52C and the top portion 52A of the outer shaft 52, and in the illustrated embodiment the outer shoulder 52D illustratively extends above a top surface of the bracket 14B when the bracket 52 is received within the opening 14C of the brackets 14A, 14B with the outer shoulder 52C in contact with a bottom surface of the bracket 14B about the opening 14C. The bore 50A of the securing member 50 illustratively defines an inner shoulder 50B which illustratively contacts the outer shoulder 52D of the outer shaft 52 to provide a positive stop to the downward travel of the securing member 50 relative to the outer shaft 52 when the securing member 50 is received on the outer shaft 52. In the illustrated embodiment, the top portion 52A of the outer shaft 52 is threaded and the bore 50A of the securing member 50 is likewise complementarily threaded, and the securing member 50 is advanced onto the top portion 52A of the outer shaft 52 and toward the terminal end 12A of the outer shaft 52 via the corresponding threaded portions thereof to secure the securing member 50 to the outer shaft. In some embodiments, the outer shoulder 52D and/or the inner shoulder 50B may be omitted.

The outer shaft 52 defines a bore 55 therein from the top portion 52A to a terminal end 52B of the bore 55. In the illustrated embodiment, the bore 55 defines an inner shoulder 52E which is illustratively located between the outer shoulders 52C and 52D defined by the outer shaft 52. An inner shaft 56 is sized to be slidingly received within and axially movable along the bore 55 defined in the outer shaft 52. The inner shaft 56 has a top portion 56A and a terminal end 56B opposite the top portion 56A, and the outer surface of the inner shaft 56 illustratively defines an outer shoulder 56C between the top portion 56A and the terminal end 56B thereof. The outer shoulder 56C of the inner shaft 56 cooperates with the inner shoulder 52D of the outer shaft 52 to provide a positive stop to the upward travel of the inner shaft 56 (within the bore 55) relative to the outer shaft 52.

A biasing member 64, e.g., a spring or other conventional biasing member, is positioned between the terminal end 52B of the bore 55 of the outer shaft 52 and the terminal end 56B of the inner shaft 56, and the biasing member 64 exerts a biasing force against the inner shaft 56 that normally biases the inner shaft 56 upwardly toward top portion 52A of the outer shaft, which results in normally biasing the outer shoulder 56C of the inner shaft 56 upwardly against the inner shoulder 52E of the outer shaft 52. In this unactuated position of the pin 12, a portion of the top portion 56A of the inner shaft 56 extends upwardly above the top portion 52A of the outer shaft 52 to its top-most position as illustrated in FIGS. 1, 2 and 6.

The biasing member 64 normally biases the inner shaft 56 to its topmost position as just described, i.e., the unactuated position of the pin 12, as long as no counterforce greater than the biasing force of the biasing member 64 is applied to the top portion 56A of the inner shaft 56. When a counterforce greater than the biasing force of the biasing member 64 is applied to the top portion 56A of the inner shaft 56, e.g., by manually applying a downward force to the terminal end of the top portion 56A of the inner shaft 56, the inner shaft 56 moves downwardly within the bore 55 toward the terminal end 52B of the bore 55 of the outer shaft 52, against the biasing force of the biasing member 64, to an actuated position of the pin 12 as will be described in greater detail below.

The outer shaft 52 illustratively defines at least one bore transversely or radially therethrough from an outer surface of the outer shaft 52 to the bore 55, e.g., near the terminal end 52B of the bore 55, and in the illustrated embodiment the outer shaft 52 defines two such radial bores 60A, 60B transversely or radially therethrough into the bore 55. The bores 60A, 60B each carry therein a detent, e.g., a ball, 62A, 62B respectively, each of which extends transversely or radially outwardly from the outer surface of the outer shaft 52 (but not movable out of the outer shaft 52 from the exterior surface thereof), and each of which is movable inwardly toward the inner shaft 56. The one or more bores, e.g., the bores 60A, 60B, may illustratively be referred to herein as a detent area of the outer shaft 52.

Figure 2:
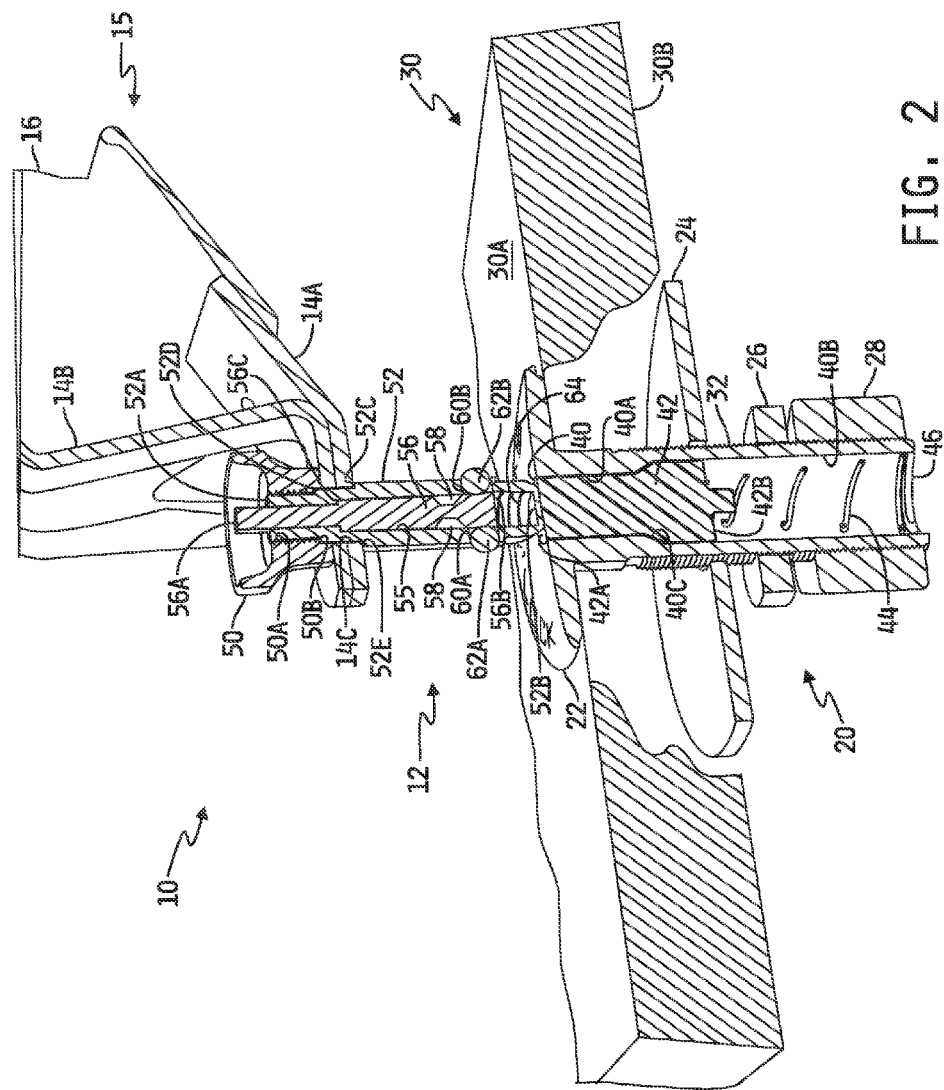
FIG. 2 is a cross-sectional view of the anchor device and a portion of the securement apparatus of FIG. 1 showing a pin of the anchor device in its unactuated state and outside of a base of the anchor device.
Figure 6:
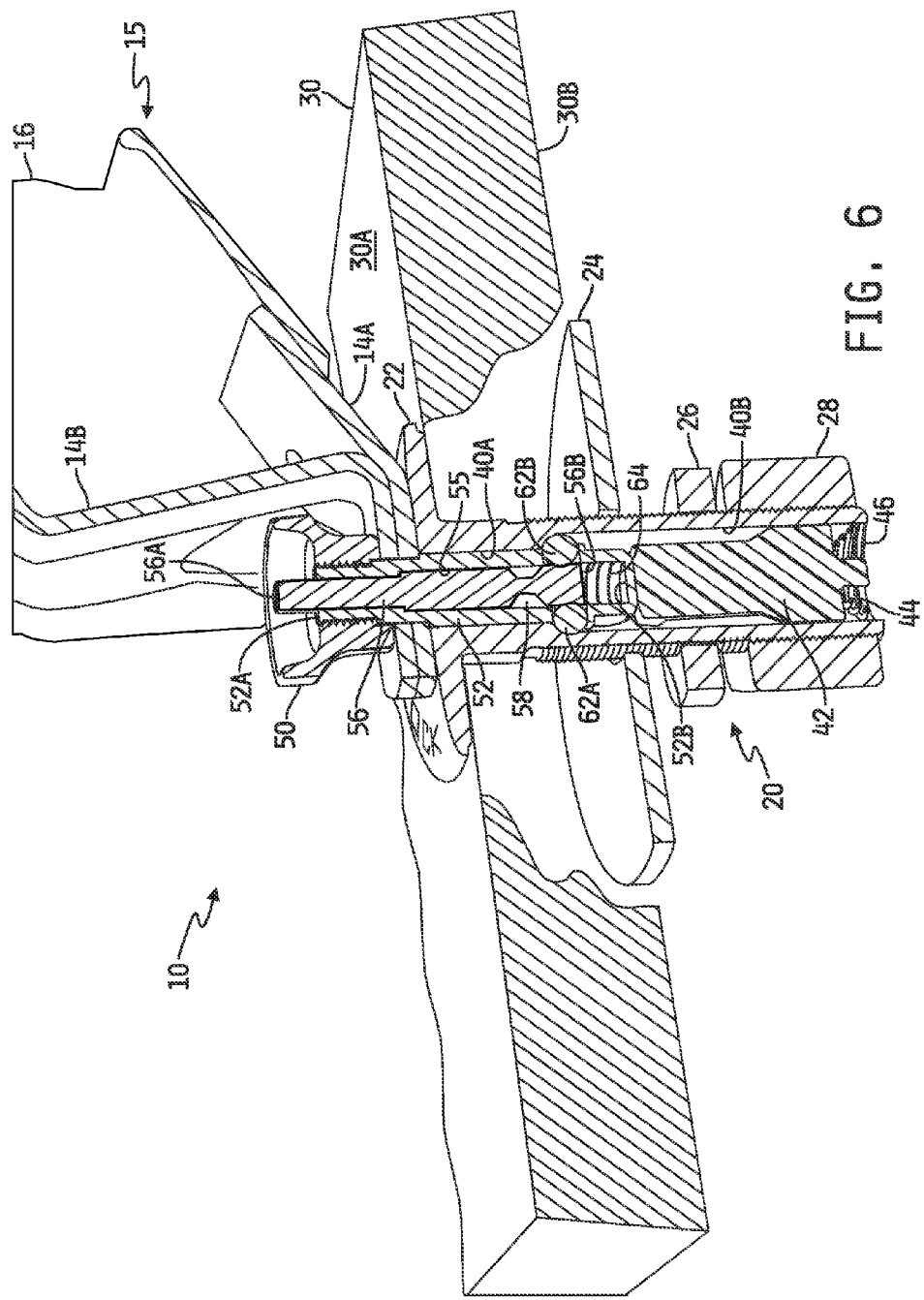
FIG. 6 is a cross-sectional view similar to FIGS. 2-5 showing the pin in its unactuated state and fully received within the base of the anchor device such that the pin is secured with the base.

In the unactuated position of the pin 12, i.e., in which the biasing member 64 biases the inner shaft 56 to its topmost position such that the top portion 56A of the inner shaft 56 extends above the top portion 52A of the outer shaft 52, the exterior surface of the inner shaft 56 forces the detents 62A, 62B to extend radially outwardly from the bores 60A, 60B as illustrated in FIGS. 1, 2 and 6. Thus, since the unactuated position of the pin 12 is one in which the biasing member 64 normally biases the inner shaft 56 to its topmost position, the one or more detents normally extend radially outwardly from the outer surface of the outer shaft 52 at the detent area of the outer shaft 52 in the unactuated position of the pin 12.

Figure 4:
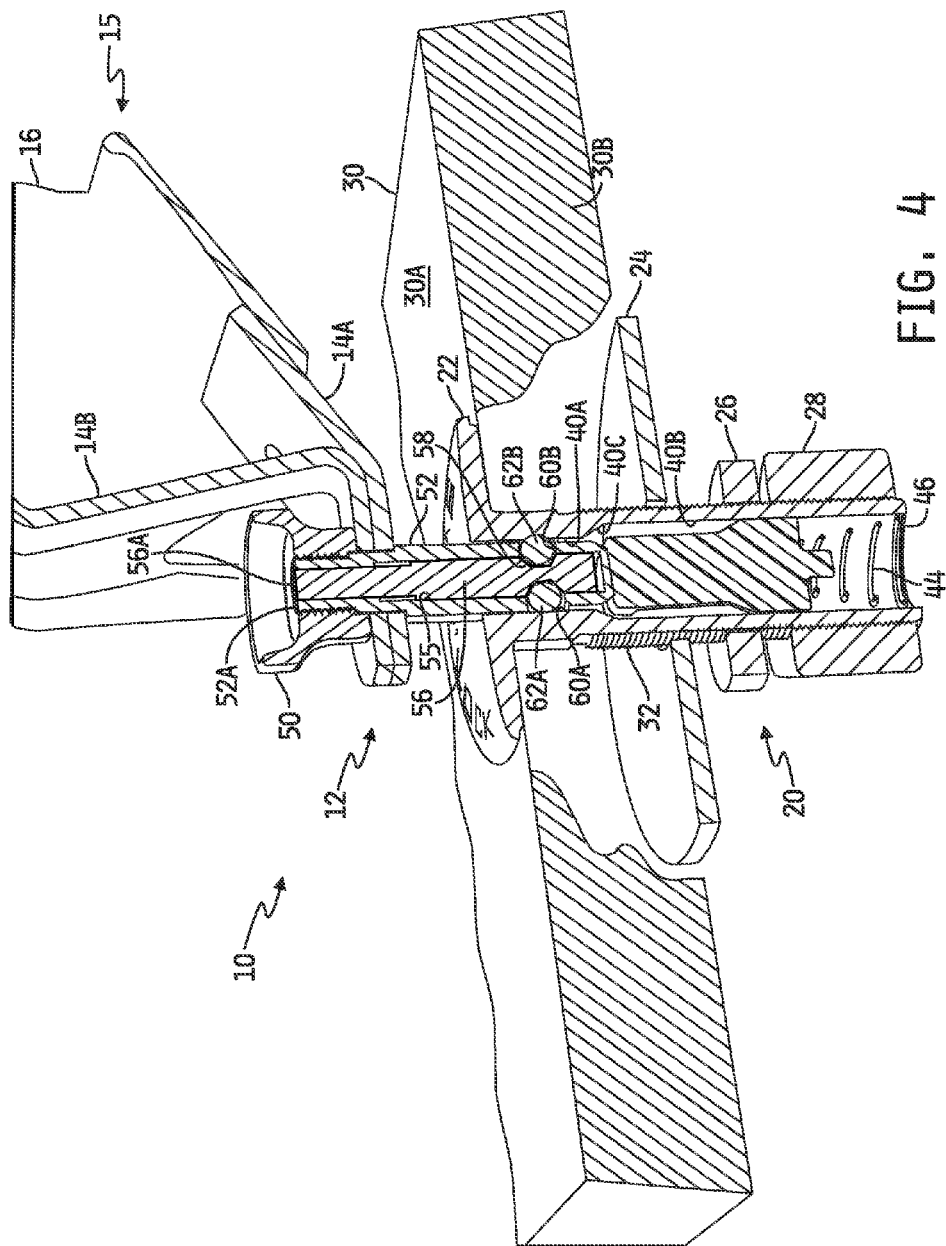
FIG. 4 is a cross-sectional view similar to FIGS. 2 and 3 showing the pin in its actuated state and partially received within the base of the anchor device.
Figure 5:
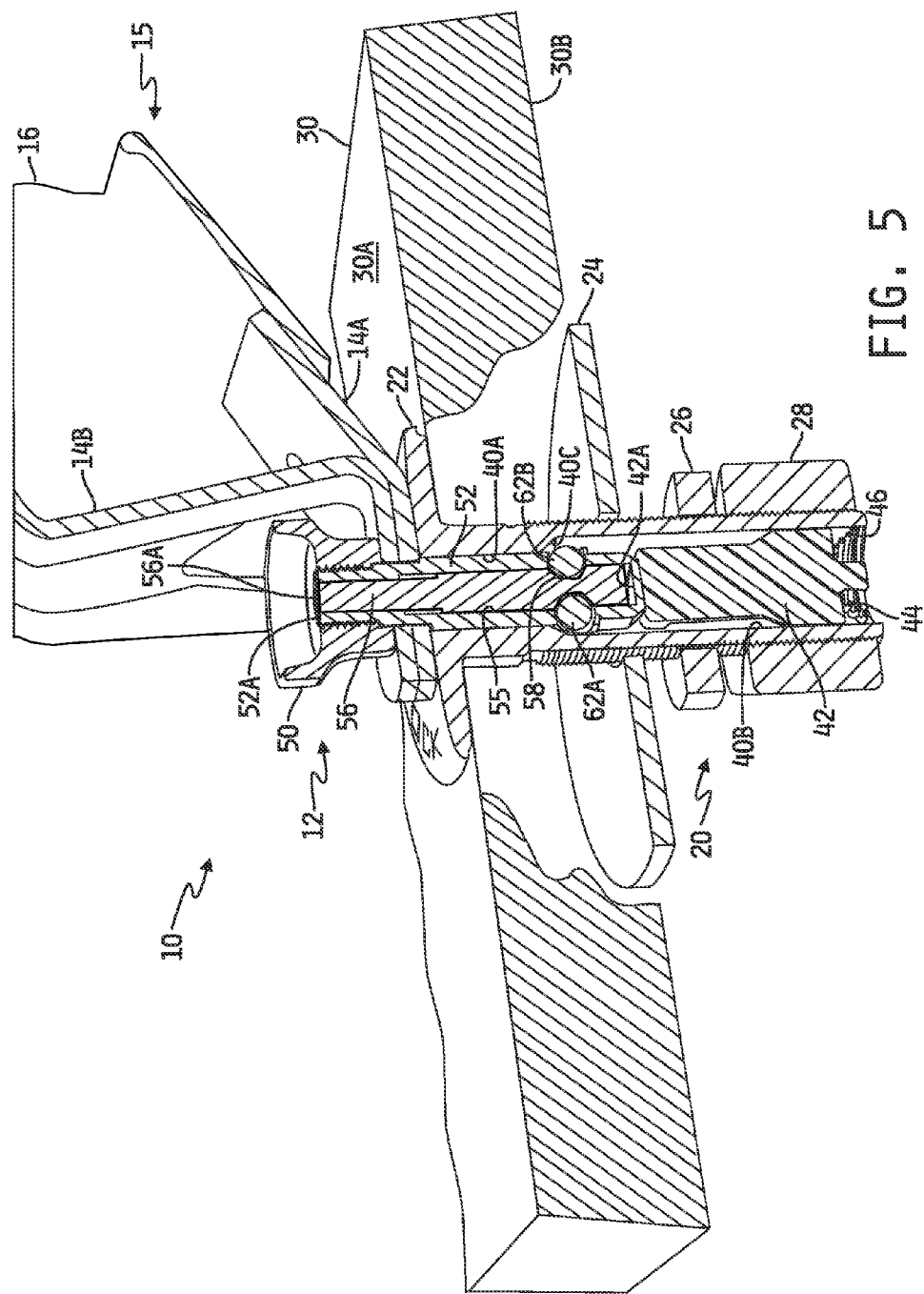
FIG. 5 is a cross-sectional view similar to FIGS. 2-4 showing the pin in its actuated state and fully received within the base of the anchor device.

The inner shaft 56 illustratively defines a recess portion on the outer surface thereof, and the recess portion defines at least one recess that extends radially inwardly from the outer surface of the inner shaft 56, e.g., toward a central longitudinal axis defined through the inner shaft 56. In the illustrated embodiment, for example, the outer surface of the inner shaft 56 defines a recess 58 therein between the terminal end 56B and the outer shoulder 56C of the inner shaft 56. The recess 58 is sized to receive each of the detents 62A, 62B therein, and the recess 58 is positioned relative to the bores 60A, 60B such that the recess 58 aligns with the bores 60A, 60B in the actuated position of the pin 12, i.e., in which a counterforce greater than the biasing force of the biasing member 64 is applied to the top portion 56A of the inner shaft 56 to cause the inner shaft 56 to move axially downwardly toward the terminal end 52B of the bore 55 of the outer shaft 52 until the recess 58 aligns with the bores 60A, 60B as illustrated in FIGS. 3-5. In the actuated position of the pin 12, the detents 62A, 62B are thus retractable radially away from the outer surface of the outer shaft 52 and into the shaft 52 at the detent area of the shaft 52 by moving radially inwardly away from the bores 60A, 60B and into the recess 58 of the inner shaft 56. It will be understood that while two bores 60A, 60B and two corresponding detents 62A, 62B are shown in the attached figures, alternate embodiments of the pin 12 may include more or fewer such bores and detents.

The length and cross-sectional area of the outer shaft 52, the sizes of the detents 62A, 62B, the position of the detents 62A, 62B relative to the length of the outer shaft 52 and the lengths and cross-sectional areas of the different sections of the bore 40A-40C are each selected to allow the pin 12 to extend fully into the bore 40A-40C only when the pin 12 is in its actuated position and to secure the pin 12 to the base 20 only when the pin 12 thereafter transitioned to its unactuated position. This sequence of securing the pin 12 to the base 20 is illustrated by example in FIGS. 2-6.

Referring to FIG. 2, the pin 12 is outside of the bore 40 and is in its unactuated position or normal state in which the biasing member 64 forces the inner shaft 56 to its uppermost position within the bore 55 of the outer shaft 52 such that the detents 62A, 62B are forced by the outer surface of the inner shaft 56 radially outwardly from the bores 60A, 60B and the top portion 56A of the inner shaft 56A extends upwardly away from the top portion 52A of the outer shaft 52. The plunger 42 is also in its default or normal position in which the biasing member 44 forces the plunger 42 to its uppermost position within the bore 40A-40C, e.g., such that the top surface 42A of the plunger 42 is coplanar with the top surface 22B of the plate 22. The outer cross-sectional area of the outer shaft 52, the detents 62A, 62B and the cross-sectional area of the bore 40A are sized and configured such that the cross-sectional area of the bore 40A is too small to allow at least the detent area of the pin 12 to enter or pass axially through the bore 40A when the detents 62A, 62B extend radially outwardly from the bores 60A, 60B, i.e., when the pin 12 is in its unactuated state.

In FIG. 3, the pin 12 has been transitioned its actuated position or state, e.g., by applying a force greater than the biasing force of the biasing member 64 to the top portion 56A of the inner shaft 56, thereby causing the inner shaft 56 to move downwardly into the bore 55 of the outer shaft 52 until the recess 58 defined in the inner shaft 56 aligns with the bores 60A, 60B defined through the outer shaft 52. In this actuated position of the pin 12, the detents 62A, 62B are movable radially inwardly into the recess 58 such that the detents 62A, 62B are thereby retractable within the bores 60A, 60B respectively of the outer shaft 52.

The outer cross-sectional area of the outer shaft 52, the detents 62A, 62B and the cross-sectional area of the bore 40A are further configured and sized such that cross-sectional area of the bore 40A is large enough to allow the pin 12 to enter and axially pass through the bore 40A when the pin 12 is in its actuated state. As illustrated in FIG. 4, for example, the pin 12 is in its actuated state and the pin 12 has entered the bore portion 40A by forcing the end 12A of the pin against the top surface 42A of the plunger 42, causing the plunger 42 to move axially downwardly into the bore 40A-40C against the biasing force of the biasing member 44. As the detent portion of the outer shaft 52 reaches the opening 40 in the top surface 22B of the plate 22, any portion(s) of the detents 62A, 62B extending outwardly from the bores 60A, 60B after actuating the pin 12 is/are forced by contact with the walls of the bore 55 to retract fully within the outer shaft 52 by extending radially inwardly from the bores 60A, 60B and into the recess 58 which are, in the actuated state of the pin 12, aligned with each other. With the detent area of the outer shaft 52 received within the bore portion 40A as illustrated in FIG. 4, the pin 12 is axially movable within the bore portion 40A.

Continued downward force applied by the pin 12 against the top surface 42A of the plunger 42 causes the pin 12 to eventually extended far enough into the bore 40A-40C such that the detent area of the outer shaft 52, i.e., the bores 60A, 60B and detents 62A, 62B, have cleared the transition portion 40C and have entered the bore portion 40B as illustrated in FIG. 5. The length of the pin 12 is illustratively selected such that the bracket 14A, 14B is forced by the securing member 50 against the top surface 22B of the plate 22 when the detent area of the outer shaft 52 has entered the bore portion 40B. With the detent area of the outer shaft 52, i.e., the bores 60A, 60B, extending into the bore portion 40B as illustrated in FIG. 5, the pin 12 is returned to its unactuated position or normal state, e.g., by removing or releasing the downward force applied to the top portion 56A of the inner shaft 56. When such downward force is removed from the top portion 56A of the shaft 56, the biasing member 64 forces the inner shaft 56 upwardly within the bore 55 to its uppermost position within the bore 55 of the outer shaft 52 such that the detents 62A, 62B are forced by the outer surface of the inner shaft 56 radially outwardly from the bores 60A, 60B and the top portion 56A of the inner shaft 56A extends upwardly away from the top portion 52A of the outer shaft 52.

As illustrated in FIG. 6, with the pin 12 in its unactuated state and with the downward force applied by the pin 12 to the top surface 42A of the plunger 42 removed, the biasing force of the biasing member 44 forces the plunger 42 upwardly toward the bore portion 40A, thereby forcing the radially extending detents 62A, 62B into contact with the transition portion 40C and thus trapping and securing the pin 12 within the bore 40A-40C and securing the pin 12, within the bore 40A-40C, to the receiving member 32 and the base 20, and thereby also to the support surface 30. As further illustrated in FIG. 6, the pin 12 thus traps the bracket 14A, 14B of the wheelchair securement apparatus 15 between the securing member 50 affixed to the top portion 52A of the outer shaft 52 and base 20 via engagement of the pin 12 with the elongated bore 40A-40C of the receiving member 32 of the base 20.

The pin 12 may be removed from the bore 40A-40C by reversing the process just described. With the pin 12 secured to the base 20 as illustrated in FIG. 6, it should be apparent that the pin 12, and thus the retractor 16, is rotatable 360 degrees relative to the base 20, i.e., relative to the bore 40A-40C, to thereby provide for any desired orientation of the wheelchair securement apparatus 15 relative to the top surface 30A of the support surface 30

In accordance with the process illustrated in FIGS. 2-6 and described above, a method of detachably connecting the wheelchair securement apparatus 15 to the support surface 30 within a motor vehicle may include passing one end, e.g., 12A, of a shaft, e.g., 52, having a securing member, e.g., 50, attached to an opposite end, e.g., 52A, thereof, through an opening, e.g., 14C, in the wheelchair securement apparatus 15, retracting within the shaft, e.g., 52, at least one detent, e.g., 62A, 62B, that normally extends radially outwardly from an outer surface of the shaft, e.g., 52, at a detent area, e.g., 60A, 60B, of the shaft, e.g., 52, with the at least one detent, e.g., 62A, 62B, retracted within the shaft, e.g., 52, and the one end of the shaft, e.g., 52, extending through the opening, e.g., 14A, in the wheelchair securement apparatus, e.g., 15, passing the one end, e.g., 12A, of the shaft, e.g., 52, including the detent area, e.g., 60A, 60B, of the shaft, e.g., 52, axially into and through a first bore portion, e.g., 40A, and into a second bore portion, e.g., 40B, of an elongated bore, e.g., 40, of a receiving member, e.g., 32, mounted to the support surface, e.g., 30, within the motor vehicle, the first bore portion, e.g., 40A, sized to prevent at least the detent area, e.g., 60A, 60B, of the shaft, e.g., 52, from axially entering the first bore portion, e.g., 40A, with the at least one detent, e.g., 62A, 62B, extending radially outwardly from the outer surface of the shaft, e.g., 52, the second bore portion, e.g., 40B, sized to allow the detent area, e.g., 60A, 60B, of the shaft, e.g., 52, to axially enter and move along the second bore portion, e.g., 40B, with the at least one detent, e.g., 62A, 62B, extending radially outwardly from the outer surface of the shaft, e.g., 52, and with at least the detent area, e.g., 60A, 60B, of the shaft, e.g., 52, disposed within the second bore portion, e.g., 40B, securing the wheelchair securement apparatus, e.g., 15, to the support surface, e.g., 30, of the motor vehicle by extending the at least one detent, e.g., 62A, 62B, radially outwardly from the outer surface of the shaft, e.g., 52, to trap the wheelchair securement apparatus, e.g., 15, on the shaft, e.g., 52, between the securing member, e.g., 50, and the elongated bore, e.g., 40, of the receiving member, e.g., 32.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. An anchor for detachably connecting a wheelchair securement apparatus to a support surface within a motor vehicle, the anchor comprising:
   a plate having a top surface defining an opening therein,
   a receiving member secured to the plate and defining an elongated bore therein, the elongated bore having an open end defined by the opening in the top surface of the plate and a wall at an opposite end thereof, the plate and the receiving member together mountable to the support surface within the motor vehicle,
   a plunger within and axially movable along the elongated bore, and
   a first biasing member between a bottom surface of the plunger and the wall of the bore defined in the receiving member, the first biasing member acting against the bottom surface of the plunger to bias the plunger away from the wall of the bore toward the opening defined through the top surface of the plate, the plunger movable toward the wall of the bore against a biasing force of the first biasing member,
   wherein the elongated bore is configured to receive therein and engage a pin, coupled to the wheelchair securement apparatus, between the open end of the elongated bore and the plunger.

2. The anchor of claim 1 wherein the top surface of the plate is planar at least about the opening defined therein and the plunger has a planar top surface opposite the bottom surface of the plunger,
   and wherein the first biasing member normally biases the plunger away from the wall of the bore to a top-most position of the plunger in which the planar top surface of the plunger is substantially coplanar with the planar top surface of the plate.

3. The anchor of claim 1 wherein the plate comprises a bottom surface opposite the top surface thereof, the receiving member extending away from the bottom surface of the plate, the receiving member configured to extend into an opening through the support surface with the bottom surface of the plate abutting the support surface about the opening through the support surface.

4. The anchor of claim 3 further comprising:
   a mounting plate defining an opening therethrough, the mounting plate received on the receiving member with the receiving member extending through the opening in the mounting plate, and
   a fixation member to engage a portion of the receiving member extending through the opening in the mounting plate with the mounting plate positioned between the plate and the fixation member, the fixation member movable along the receiving member and against the mounting plate to advance the mounting plate toward the bottom surface of the plate to clamp the support surface between the bottom surface of the plate and a top surface of the mounting plate.

5. The anchor of claim 4 wherein the receiving member comprises a first elongated shaft defining the bore therein,
   and wherein at least a portion of the first shaft is threaded,
   and wherein the fixation member comprises a threaded nut, the fixation member movable along the receiving member by advancing the threaded nut onto the threaded portion of the first shaft.

6. The anchor of claim 4 wherein the bottom surface of the plate is planar, and wherein the top surface of the mounting plate is planar.

7. The anchor of claim 1 wherein the plate comprises a bottom surface opposite the top surface thereof,
   and wherein the top surface of the plate is planar at least about the opening defined therein and the bottom surface of the plate is planar and wherein the plate defines a thickness between the planar top surface and the planar bottom surface thereof of less than about 0.15 inches.

8. The anchor of claim 7 wherein the thickness is about 0.13 inches.

9. The anchor of claim 1 wherein the receiving member and the plate are separate parts and the receiving member is attached to the plate.

10. The anchor of claim 1 wherein the receiving member is integral with the plate such that the receiving member and the plate together define a unitary member.

11. An anchor for detachably connecting a wheelchair securement apparatus to a support surface within a motor vehicle, the anchor comprising:
    a plate having a top surface defining an opening therein,
    a receiving member secured to the plate and defining an elongated bore therein, the elongated bore having an open end defined by the opening in the top surface of the plate and a wall at an opposite end thereof, the plate and the receiving member together mountable to the support surface within the motor vehicle,
    a plunger within and axially movable along the elongated bore,
    a first biasing member between a bottom surface of the plunger and the wall of the bore defined in the receiving member, the first biasing member acting against the bottom surface of the plunger to bias the plunger away from the wall of the bore toward the opening defined through the top surface of the plate, the plunger movable toward the wall of the bore against a biasing force of the first biasing member, and
    a pin configured to be coupled to the wheelchair securement apparatus, the elongated bore configured to receive and engage the pin, the pin comprising
    a first shaft defining a detent area on an outer surface thereof, and at least one detent normally extending radially outwardly from the outer surface of the first shaft at the detent area, the at least one detent retractable within the first shaft at the detent area, wherein the elongated bore defines a first bore portion extending from the opening in the top surface of the plate toward the wall of the elongated bore, the opening in the top surface of the plate and the first bore portion both defining a first cross-sectional area, the first cross-sectional area sized to prevent at least the detent area of the first shaft from axially entering the first bore portion via the opening in the top surface of the plate with the at least one detent extending radially outwardly from the outer surface of the first shaft and to allow the first shaft, including the detent area, to axially enter and move along the first bore portion with the at least one detent retracted within the first shaft.

12. The anchor of claim 11 wherein the elongated bore defines a second bore portion extending from the wall of the bore toward the first bore portion, the second bore portion defining a second cross-sectional area that is greater than the first cross-sectional area defined by the first bore portion, the second cross-sectional area sized to allow the first shaft, including the detent area, to axially enter and move along the second bore portion with the at least one detent extending radially outwardly from the outer surface of the first shaft or retracted within the first shaft, and wherein the pin is secured to the receiving member by axially passing the detent area of the first shaft into and through the first bore portion and into the second bore portion with the at least one detent retracted within the first shaft, and extending the at least one detent radially outwardly from the outer surface of the first shaft with at least the detent area of the pin disposed within the second bore portion.

13. The anchor of claim 12 wherein the elongated bore defines a transition portion between the first bore portion and the second bore portion, the transition portion extending between the first cross-sectional area of the first bore portion and the second cross-sectional area of the second bore portion, and wherein the biasing force of the first biasing member acting against the bottom surface of the plunger with the at least one detent extending radially outwardly from the outer surface of the first shaft pinto the second bore portion causes the plunger to force the at least one detent into engagement with the transition portion of the bore to secure the pin to the receiving member.

14. The anchor of claim 11 wherein the pin further comprises a second shaft axially received within and axially movable relative to the first shaft, the second shaft defining a recess portion on an outer surface thereof, the recess portion defining at least one recess radially extending into the outer surface of the second shaft, the at least one recess sized to receive therein the at least one detent with the detent area of the first shaft aligned with the recess portion of the second shaft to thereby retract the at least one detent within the first shaft, the outer surface of the second shaft otherwise forcing the at least one detent to extend radially outwardly from the outer surface of the first shaft.

15. The anchor of claim 14 wherein the first shaft defines a first end and a second end opposite the first end thereof, and wherein the second shaft defines a first end that extends toward the first end of the first shaft with the second shaft axially received within the first shaft, and a second end opposite the first end of the second shaft, and wherein the pin further comprises a second biasing member between the first end of the first shaft and the first end of the second shaft, the second biasing member normally biasing the first end of the second shaft away from the first end of the first shaft so that the at least one recess of the recess portion of the second shaft is not aligned with the at least one detent normally extending radially outwardly from the outer surface of the first shaft at the detent area.

16. The anchor of claim 15 wherein the second shaft is axially movable relative to the first shaft against a biasing force of the second biasing member to align the at least one recess defined in the recess portion of the second shaft with the at least one detent normally extending radially outwardly from the outer surface of the first shaft at the detent area.

17. The anchor of claim 11 further comprising a securing member affixed to the first shaft, the securing member configured to trap the wheelchair securement apparatus between the securing member and the receiving member with the elongated bore engaging the pin.

18. An anchor for detachably connecting a wheelchair securement apparatus to a support surface within a motor vehicle, the anchor comprising:

a plate having a top surface defining an opening therein, a receiving member secured to the plate and defining an elongated bore therein, the elongated bore having an open end defined by the opening in the top surface of the plate and a wall at an opposite end thereof, the plate and the receiving member together mountable to the support surface within the motor vehicle, a plunger within and axially movable along the elongated bore, a first biasing member between a bottom surface of the plunger and the wall of the bore defined in the receiving member, the first biasing member acting against the bottom surface of the plunger to bias the plunger away from the wall of the bore toward the opening defined through the top surface of the plate, the plunger movable toward the wall of the bore against a biasing force of the first biasing member, and a pin configured to be coupled to the wheelchair securement apparatus, the pin having at least one shaft extending into the elongated bore between the open end of the bore and the plunger, the elongated bore engaging the at least one shaft of the pin, the at least one shaft rotatable 360 degrees within the elongated bore with the elongated bore engaging the at least one shaft of the pin.

* * * * *